US012386089B2

(12) United States Patent
Brower

(10) Patent No.: US 12,386,089 B2
(45) Date of Patent: Aug. 12, 2025

(54) SENSOR DISPLACEMENT TUNING BODY AND APPARATUSES, SYSTEMS, AND METHODS COMPRISING SAME

(71) Applicant: Astro Technology Group, LLC, Houston, TX (US)

(72) Inventor: David Verl Brower, Houston, TX (US)

(73) Assignee: Astro Technology Group, LLC, Houston, TX (US)

( * ) Notice: Subject to any disclaimer, the term of this patent is extended or adjusted under 35 U.S.C. 154(b) by 197 days.

(21) Appl. No.: 18/183,788

(22) Filed: Mar. 14, 2023

(65) Prior Publication Data
US 2024/0310539 A1    Sep. 19, 2024

(51) Int. Cl.
*G01V 1/22* (2006.01)
*G01V 1/00* (2024.01)

(52) U.S. Cl.
CPC .............. *G01V 1/226* (2013.01); *G01V 1/001* (2013.01)

(58) Field of Classification Search
CPC ................................ G01V 1/226; G01V 1/001
USPC ............................................................ 73/655
See application file for complete search history.

(56) References Cited

U.S. PATENT DOCUMENTS

| | | | | |
|---|---|---|---|---|
| 4,168,109 | A * | 9/1979 | Dumire | G02B 6/3855 385/60 |
| 7,003,184 | B2 * | 2/2006 | Ronnekleiv | A61B 5/01 385/12 |
| 7,772,541 | B2 * | 8/2010 | Froggatt | A61B 1/00165 250/226 |
| 7,781,724 | B2 * | 8/2010 | Childers | A61B 1/00165 250/227.14 |
| 8,864,655 | B2 * | 10/2014 | Ramamurthy | A61B 1/00045 600/117 |
| 9,186,046 | B2 * | 11/2015 | Ramamurthy | A61B 1/00057 |
| 9,927,263 | B2 * | 3/2018 | Young | H02G 1/10 |
| 10,837,805 | B2 * | 11/2020 | Godfrey | G01L 1/243 |
| 2015/0067967 | A1 * | 3/2015 | Tyree | A47C 27/15 5/691 |

* cited by examiner

*Primary Examiner* — Jacques M Saint Surin
(74) *Attorney, Agent, or Firm* — David O. Simmons; IVC Patent Agency

(57) ABSTRACT

Disclosed herein are embodiments of a sensor displacement device. The sensor displacement device is engaged with an optical fiber sensor (or other suitable form of a sensor) and slows recover of the sensor when displaced (e.g., deformed) from a static state. In doing so, the sensor displacement tuning body serves to enable amplification of signal detection associated with a given instance of sensor displacement.

10 Claims, 3 Drawing Sheets

SENSOR DISPLACEMENT TUNING BODY AND APPARATUSES, SYSTEMS, AND METHODS COMPRISING SAME

FIELD OF THE DISCLOSURE

The disclosures made herein relate generally to devices, apparatuses, systems, and methods for sensing proximity and presence and, more particularly, to devices, apparatuses, systems, and methods that utilize optical fiber sensors for sensing proximity and presence.

BACKGROUND

Optical fiber sensors are well known in the art. They are used in many application including parameter sensing in equipment and systems, proximity sensing, presence detection, and the like. Optical fiber sensors are advantages in many application because of their underlying operational characteristics. One such characteristic is that they are durable and long-lasting in that they have no moving parts. Another such characteristic is that they exhibit exceptional signal sensitivity as a function of sensor displacement (e.g., deformation such as bending). Still another such characteristic is that they exhibit exceptional detection response due to the sensing medium being light carried through a glass fiber.

The particular application in which optical fiber sensors are used may have certain impact on their aforementioned underlying characteristics and may potentially influence installation attributes for best achieving necessary operational characteristics for that particular application. For example, in some applications, sensor displacement is adversely limited by an associated substrate thereby adversely impacting signal characterization and/or detection. In another example, sensor and substrate characteristics may adversely impact signal duration thereby adversely impacting signal characterization and/or detection.

As shown in FIGS. 1 and 2, a fiber optic sensor apparatus 1 includes a fiberoptic cable 2 and sensor support substrate 10. The sensor support substrate 10 may have a fiber optic sensor 5 of the fiberoptic cable 2 fixedly attached thereto. It is well known that the fiber optic sensor 5 may be fixedly attached to the sensor support substrate 10 via a bonding material 13 such as epoxy adhesive of the like. As shown in FIG. 2, when an external force F is applied onto an external surface 9 of the fiber optic cable 2, a corresponding portion of the fiber optic cable 2 deforms (e.g., compresses) as a function of the applied external force F when the sensor support substrate 10 has a rigidity/stiffness that precludes a corresponding deformation that enables the fiber optic sensor 5 to displace (e.g., bend) as a function of the external force F. Such deformation may result in permanent damage to the fiber optic cable 2 (e.g., a fiber optic core thereof). Such deformation of the fiber optic cable 2 is known to adversely affect signal output and response of the fiber optic cable 2 (e.g., a fiber optic sensor thereof) as well as potentially causing damage to the fiber optic cable 2. Such adverse effect on sensor output and response as well as the potential for causing damage is particularly probable when the force F is of sufficient magnitude and/or particular mode (e.g., high stress) whereby a fiber optic core (e.g., including a fiber optic sensor) of the fiber optic cable 2 is deformed.

Therefore, devices that enables sensitivity and/or response of optical fiber sensors to be tuned for achieving desired sensitivity and/or response for a given application and/or installation approach are beneficial, desirable and useful.

SUMMARY OF THE DISCLOSURE

Embodiments of the disclosures made herein are directed to devices that enables sensitivity and/or response of optical fiber sensors to be tuned for achieving desired sensitivity and/or response for a given application and/or installation approach. Embodiments of the disclosures made herein address considerations arising from the manner in which a particular fiber optic sensor application may have certain impact on their underlying performance characteristics and the manner in which a particular application may potentially influence installation attributes for best achieving necessary operational characteristics for that particular application. For example, embodiments of the disclosures made herein may overcome adverse implications arising from the manner in which interaction between a fiber optic sensor and an associated support substrate adversely impacting signal characterization and/or detection.

In one embodiment of the disclosures made herein, a fiber optic sensor apparatus comprises a fiberoptic cable disposed within a sensor displacement (e.g., bend) tuning body. The sensor displacement tuning body extends along at least a portion of a length of the fiberoptic cable and the sensor displacement tuning body is made of a material composition comprising a viscoelastic material.

In another embodiment of the disclosures made herein, a fiber optic sensor apparatus comprises a fiberoptic cable, a sensor displacement tuning body, and a support substrate. The fiberoptic cable includes an outer jacket having at least one optical fiber contained within a central passage thereof. The sensor displacement tuning body is engaged with an exterior surface of the outer jacket. The sensor displacement tuning body extends along a length of the fiberoptic cable and the sensor displacement tuning body is made of a material composition comprising a viscoelastic material. The tuning body has an elongated cross-sectional shape, the outer jacket has a substantially round cross-sectional shape and a centerline longitudinal axis of outer jacket generally bisects the sensor displacement tuning body along a width and height thereof. The sensor displacement tuning body has a top surface and a bottom surface. The support substrate is attached to at least one of the optical fiber and the sensor displacement tuning body. The support substrate extends along a length of the fiberoptic cable. The support substrate extends across at least a portion of a width of the bottom surface of the sensor displacement tuning body.

In another embodiment of the disclosures made herein, a fiber optic sensor system comprises a fiber optic sensor apparatus and a sensor support substrate. The fiber optic sensor apparatus comprises a fiberoptic cable and a sensor displacement tuning body. The fiberoptic cable includes an outer jacket having at least one optical fiber contained within a central passage thereof. The sensor displacement tuning body is attached to an exterior surface of the outer jacket. The sensor displacement tuning body extends along at least a portion of a length of the fiberoptic cable. The sensor displacement tuning body is made of a material composition comprising a viscoelastic material. The sensor support substrate has opposing end portions and a fiber optic cable carrying portion extending therebetween. The sensor displacement tuning body is engaged with the fiber optic cable carrying portion of the sensor support substrate at selective location thereof or along an entire length thereof. Each one of the opposing end portions of the fiberoptic cable is located at a respective one of the opposing end portions of the sensor support substrate.

These and other objects, embodiments, advantages and/or distinctions of the present invention will become readily apparent upon further review of the following specification, associated drawings and appended claims.

DETAILED DESCRIPTION

Figure 1:
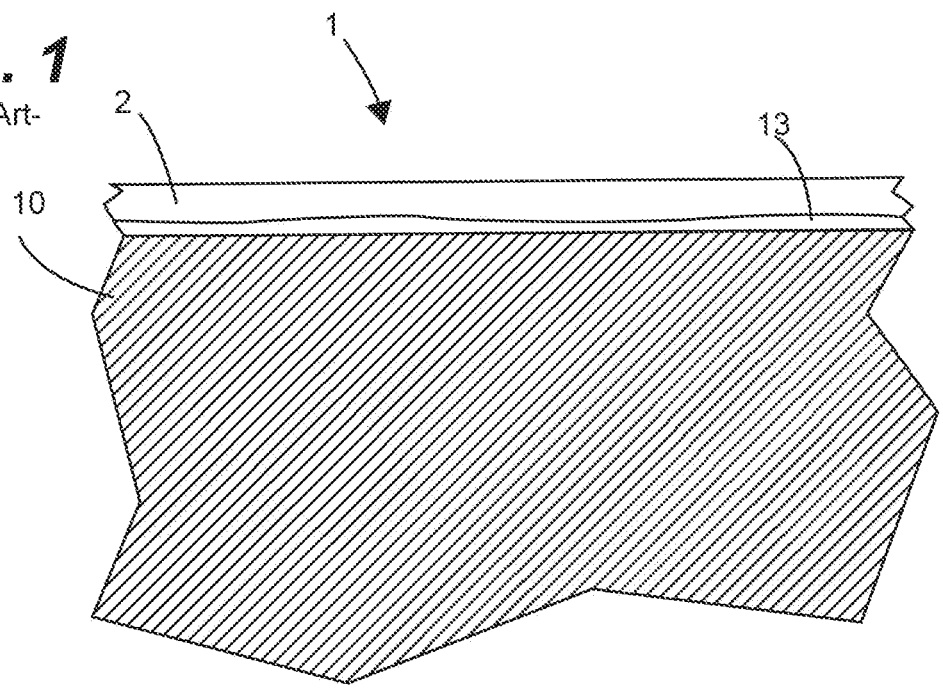
FIG. 1 is an illustrative, partially cross-sectioned view showing a prior art fiber optic sensor apparatus that is subject to adverse compression of a fiber optic sensor thereof.
Figure 2:
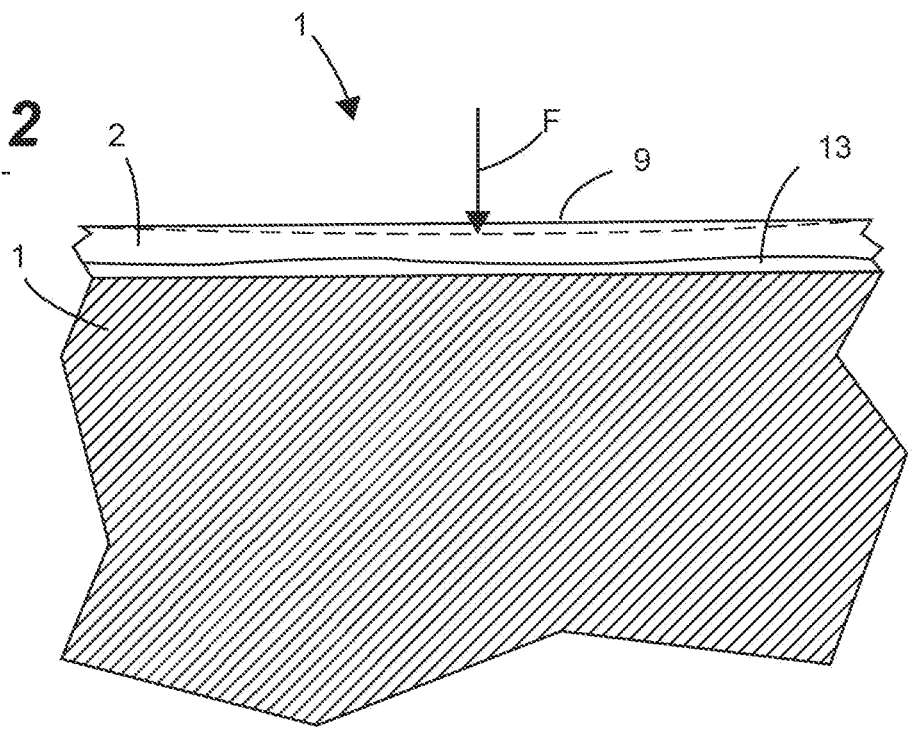
FIG. 2 is an illustrative, partially cross-sectioned view showing the prior art fiber optic sensor apparatus of FIG. 1 with an external force exerted on the fiber optic sensor thereof.
Figure 3:
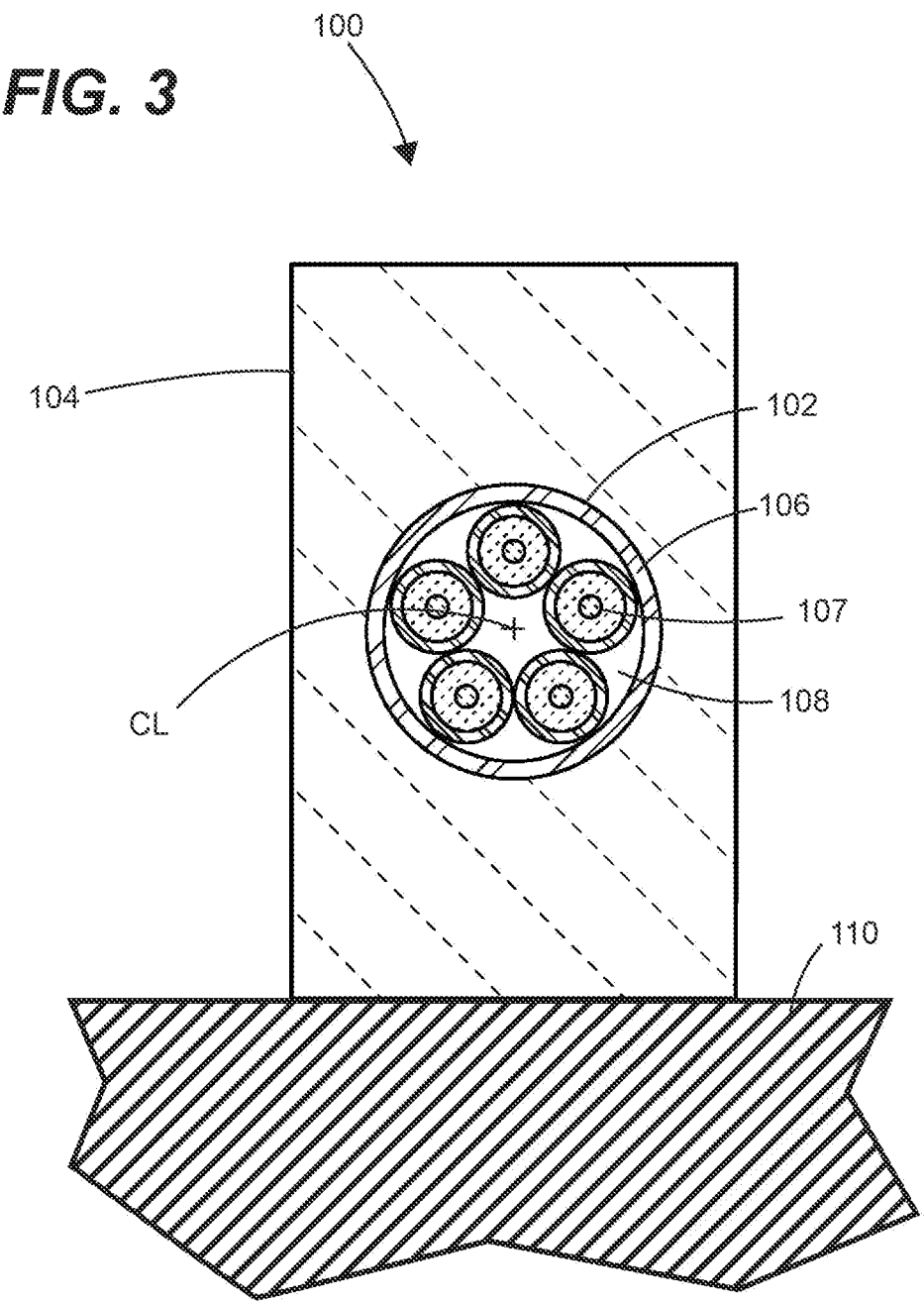
FIG. 3 is a cross-sectional view of an embodiment of a fiber optic sensor apparatus in accordance with one or more embodiments of the disclosures made herein.
Figure 4:
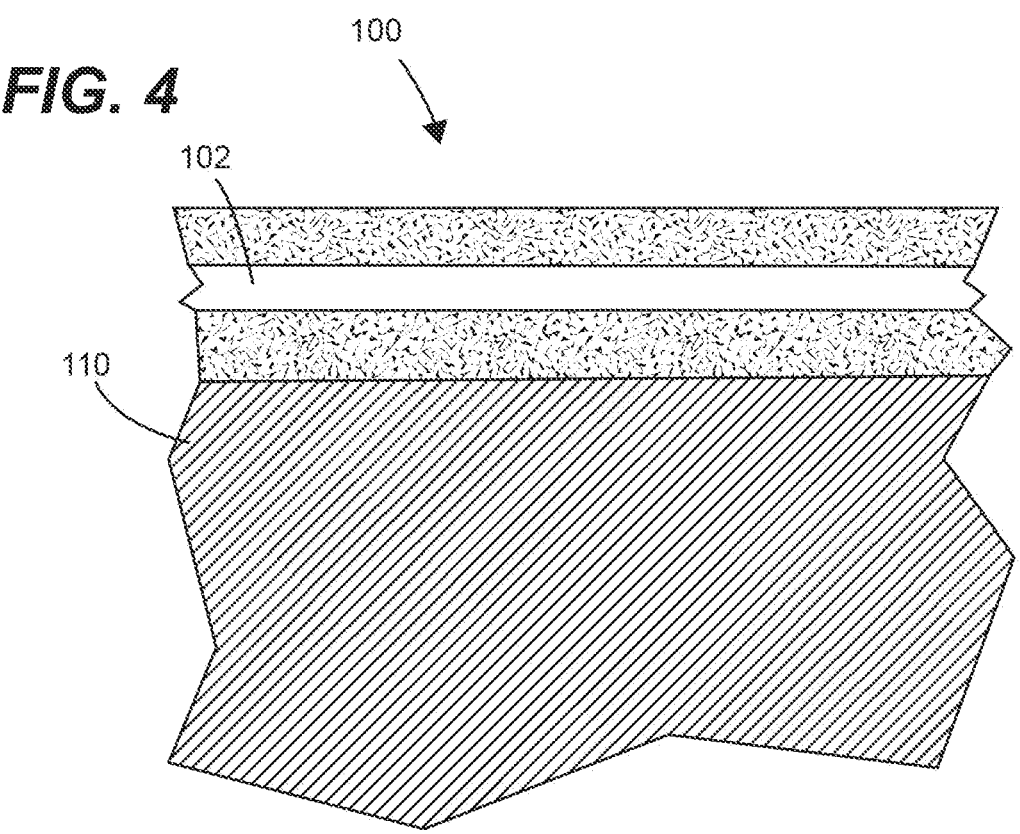
FIG. 4 is an illustrative, partially cross-sectioned view showing a partial cross-sectional view of the fiber optic sensor apparatus of FIG. 3.
Figure 5:
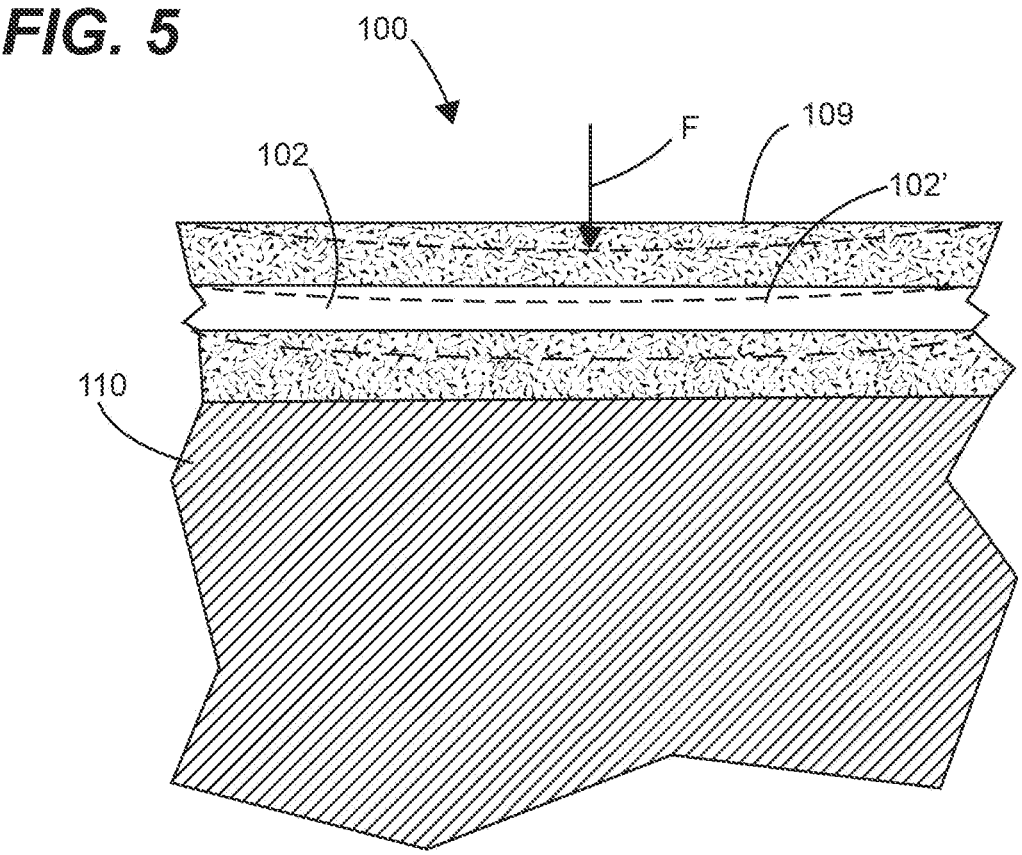
FIG. 5 an illustrative, partially cross-sectioned view showing the fiber optic sensor apparatus of FIG. 3 with an external force exerted on a sensor displacement tuning body thereof.

Referring to FIGS. 3-5, a fiber optic sensor apparatus in accordance with one or more embodiments of the disclosures made herein (i.e., fiber optic sensor apparatus 100) is shown. The fiber optic sensor apparatus 100 may include a fiberoptic cable 102 and a sensor displacement tuning body 104. The sensor displacement tuning body 104 is preferably made from a resilient material such as a resilient polymeric material. The fiberoptic cable 102 may include an outer jacket 106 having a plurality of optical fibers 107 (or optionally a single optical fiber) contained within a central passage 108 thereof. The fiberoptic cable 102 is located within the sensor displacement tuning body 104—e.g., embedded within, extending through a passage of, etc.

The sensor displacement tuning body 104 extends along at least a portion of a length of the fiberoptic cable 102. In some embodiments, the fiber optic sensor apparatus may include a plurality of sensor displacement tuning bodies 104 that each extend along a length of a respective one of a plurality of discrete fiber optic sensors of the fiberoptic cable 102. In other embodiments, the fiber optic sensor apparatus may include a plurality of sensor displacement tuning body 104 that each extend along a respective portion of a length of the fiberoptic cable 102.

As shown in FIG. 5, when an external force F is applied onto an external surface 109 of the sensor displacement tuning body 104, a corresponding portion of the sensor displacement tuning body 104 deforms (e.g., compresses) as a function of the applied external force F. Advantageously, this deformation of the sensor displacement tuning body 104 results in a corresponding (e.g., proportional) deformation of an adjacent portion 102' the fiberoptic cable 102 (e.g., including a fiber optic sensor thereof) in a manner that is not entirely dictated by the rigidity/stiffness of a sensor support substrate 110 with which the sensor displacement tuning body 104 is engaged (e.g., bonded to, formed over, etc.).

In the case of presence detection (e.g., a person or animal walking over a fiber optic sensor apparatus in accordance with one or more embodiments of the disclosures made herein), the outer jacket 106 need not be stripped for enabling an underlying core (e.g., fiber optic sensor thereof) to be directly engaged with or attached to the sensor displacement tuning body 104. In some embodiments, the force may correspond to an external loading exerted from foot traffic, vehicular traffic, body part loadings, and/or vibrations).

The sensor displacement tuning body 104 may have an elongated cross-sectional shape and the outer jacket 106 may have a substantially round cross-sectional shape. In one or more embodiments, the sensor displacement tuning body 104 has a substantially round cross-sectional shape, the outer jacket 106 of the fiberoptic cable 102 has a substantially round cross-sectional shape, and the sensor displacement tuning body 104 and the outer jacket 106 are substantially concentric with each other. Preferably, a centerline longitudinal axis CL of outer jacket 106 generally bisects the sensor displacement tuning body 104 along a width and height thereof. Optionally, the sensor displacement tuning body 104 may have a substantially round cross-sectional shape, with the sensor displacement tuning body 104 and the outer jacket 106 being substantially concentric. A protective covering (not shown) may extend over all of a portion of an exterior surface of the sensor displacement tuning body 104.

In some embodiments, the sensor displacement tuning body 104 may be a pre-formed body that included a central passage within which the fiberoptic cable 102 is positioned. In other embodiments, the sensor displacement tuning body 104 may be formed over the fiberoptic cable 102 such as by extrusion (e.g., subsequent to or in parallel with extrusion of an outer jacket of the fiberoptic cable) or such as by continuous casting of the sensor displacement tuning body 104. In still other embodiments, the fiberoptic cable 102 may be sandwiched between two separate layers of material that jointly define the sensor displacement tuning body 104. In all implementations, the sensor displacement tuning body 104 may be bonded to the exterior surface of the outer jacket 106 along all or a portion of the length of the sensor displacement tuning body 104 such as by molecular or physical bonding during an extrusion process or by use of a bonding material such as an adhesive. The sensor displacement tuning body 104 may be in the form of a mat upon which a person and/or animal may walk, where the mat carries at least a portion of a length of a fiberoptic cable. Where the sensor displacement tuning body 104 is in the form of a mat, a length of the fiberoptic cable 102 may be substantially greater than a length of an fiberoptic cable carrying portion of the sensor support substrate 104 and the fiberoptic cable 102 may extend substantially non-linearly over a length of the fiberoptic cable carrying portion of the sensor support substrate.

The sensor displacement tuning body 104 may be made from a material that exhibits compressive properties that serve to prolong the existence of deformation (e.g., bending) of the fiberoptic cable 102 created by the external force F exerted thereon. Such prolonged existence of the deformation of the fiberoptic cable 102 serves to amplify an associated detection signal by virtue of the signal duration. To this end, the sensor displacement tuning body 104 may preferably be made of a material composition comprising a viscoelastic foam material or consisting essentially of a viscoelastic foam material whereby resiliency characteristics may be tuned/specified to achieve suitable sensor displacement performance. Viscoelastic foam, also referred to as "memory foam", may be an open-cell foam that has slow recovery that may be controlled by its formulation.

Polyurethane is a preferred material from which viscoelastic foam may be made. Viscoelastic foam is typified by its slow recovery after compression. When a weighted object (for example, the human body) is positioned on viscoelastic foam, the foam progressively conforms to the shape of the object, and after the weight is removed, the foam slowly reassumes its initial shape. Due to this gradual recovery, viscoelastic foam also may be described as "slow recovery" foam. In other words, when it is compressed or otherwise deformed, the foam does not quickly recover to its original shape. Instead, it slowly conforms to the contact shape of and supports the weight of the object compressing it. While most of the physical properties of viscoelastic foams resemble those of conventional foams, the resilience of viscoelastic foams is much lower, generally less than about 15%.

Functionality of memory foam may be characterized factors including density, firmness and rate sensitivity. The density for viscoelastic foam is the weight of one cubic foot of material measured in pounds. A higher foam density generally equates to increased foam durability (retention of performance properties). Density enhances durability and the ability of viscoelastic foam to maintain its physical performance. Viscoelastic foam found in many common applications typically ranges in density from 2 to 6 pounds per cubic foot (pcf).

Firmness of viscoelastic foams may range from supersoft (less than 10 lbs. @ 25% IFD) to semi-rigid (as high as 120 lbs. @ 25% indention force deflection (IFD)). The potential for surface pressure reduction is closely associated with firmness, and may vary based on the formulation. Viscoelastic foams with a lower IFD tend to exhibit increased conformance and may distribute body weight more efficiently to alleviate pressure. However, if the IFD is very low, and there is not sufficient foam density or thickness to provide support, the product may "bottom out," negating the benefits of pressure reduction. When performing IFD tests, firmness measurements of viscoelastic products may be significantly affected by some of the foam's key characteristics: rate sensitivity (the foam's rate of recovery after compression), sensitivity to temperature, and sensitivity to humidity. Sample conditioning prior to testing is extremely important. In a preferred embodiment, the viscoelastic foam material may have a density between about 4.0 and about 6.0 lbs. per cubic foot and an indention load deflection (IDF) of up to about 50%.

Viscoelastic foam rate sensitivity, observed as the speed that a foam sample recovers after compression, affects the way firmness (i.e., IFD) may be determined in laboratory tests. Because of rate sensitivity, when testing viscoelastic foam under load, as in IFD measurement, the speed at which the weight force is applied may alter firmness readings. In other words, if the indentation plate used in the test descends quickly, the foam may respond with stiffness, whereas slower speeds may result in different IFD measurements. With viscoelastic products, IFD tests should show notation of the process speed (rate of deflection) being used so that valid and fair comparisons among foam grades and between laboratories may be consistently made.

In preferred embodiments, parameters of both the fiberoptic cable 102 and the sensor displacement tuning body 104 may be jointly configured to achieve a specified nominal response period for a specified segment of the fiber optic sensor apparatus 100. The nominal response period is defined as a duration of time for the fiberoptic cable 102 of the fiber optic sensor apparatus 100 to return to a specified condition (e.g., X percent of recover to an initial state prior to forced displacement). For example, one or more physical parameters of the fiberoptic cable 102 (e.g., stiffness) and one or more physical parameters of the sensor displacement tuning body 104 (e.g., IFD) may be specified to achieve a specified nominal response period for a specified segment of the fiber optic sensor apparatus 100, where the nominal response period is a function of a nominal signal processing time for confirming displacement of the fiberoptic cable 102 using fiber optic signal processing techniques based upon propagation of a light signal through an optical fiber core of the fiberoptic cable 102.

The previous description of the disclosed embodiments is provided to enable any person skilled in the art to make or use the inventive subject matter. Various modifications to these embodiments will be readily apparent to those skilled in the art, and the generic principles defined herein may be applied to other embodiments without departing from the spirit or scope of the inventive subject matter. Thus, the inventive subject matter is not intended to be limited to the embodiments shown herein but is to be accorded the widest scope consistent with the principles and novel features disclosed herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A fiber optic sensor apparatus, comprising:
   a fiberoptic cable including an outer jacket having at least one optical fiber contained within a central passage thereof;
   a sensor displacement tuning body engaged with an exterior surface of the outer jacket, wherein the sensor displacement tuning body extends along a length of the fiberoptic cable, wherein the sensor displacement tuning body is made of a material composition comprising a viscoelastic material, wherein the tuning body has an elongated cross-sectional shape, wherein the outer jacket has a substantially round cross-sectional shape, wherein a centerline longitudinal axis of outer jacket generally bisects the sensor displacement tuning body along a width and height thereof and wherein the sensor displacement tuning body has a top surface and a bottom surface; and
   a support substrate attached to at least one of the optical fiber and the sensor displacement tuning body, wherein the support substrate extends along a length of the fiberoptic cable and wherein the support substrate extends across at least a portion of a width of the bottom surface of the sensor displacement tuning body.

2. The apparatus of claim 1 wherein the viscoelastic material comprises a memory foam having a density between about 4.0 and about 6.0 lbs. per cubic foot and an indention load deflection up to about 50%.

3. The apparatus of claim 1 wherein the sensor displacement tuning body is bonded onto the exterior surface of the outer jacket along an entire length thereof.

4. A fiber optic sensor system, comprising:
a fiber optic sensor apparatus comprising a fiberoptic cable and a sensor displacement tuning body, wherein the fiberoptic cable includes an outer jacket having at least one optical fiber contained within a central passage thereof, wherein the sensor displacement tuning body is attached to an exterior surface of the outer jacket, wherein the sensor displacement tuning body extends along at least a portion of a length of the fiberoptic cable and wherein the sensor displacement tuning body is made of a material composition comprising a viscoelastic material; and
a sensor support substrate having opposing end portions and a fiber optic cable carrying portion extending therebetween, wherein the sensor displacement tuning body is engaged with the fiber optic cable carrying portion of the sensor support substrate at least at a plurality of locations thereof, and wherein each one of opposing end portions of the fiberoptic cable is located at a respective one of the opposing end portions of the sensor support substrate.

5. The fiber optic sensor system of claim 4 wherein the opposing end portions of the sensor support substrate each include a substrate coupling structure engageable with at least one of a discrete substrate coupler and a substrate coupling structure of each other one of the opposing end portions of the sensor support substrate.

6. The fiber optic sensor system of claim 5 wherein the substrate coupling structure at the opposing end portions of the sensor support substrate each have a structural configuration enabling mating engagement therebetween.

7. The fiber optic sensor system of claim 6 wherein:
the length of the fiberoptic cable is substantially greater than a length of the fiber optic cable carrying portion of the sensor support substrate; and
the fiberoptic cable extends substantially non-linearly over a length of the fiber optic cable carrying portion of the sensor support substrate.

8. The fiber optic sensor system of claim 4 wherein most distant points of attachment of the fiberoptic cable to the sensor support substrate along the length thereof are approximately at a mid-point position of the corresponding opposing edge.

9. The fiber optic sensor system of claim 4 wherein the fiberoptic cable is attached to the sensor support substrate along the entire length thereof between the most distant points of attachment thereof to the sensor support substrate.

10. The fiber optic sensor system of claim 4 wherein:
the length of the fiberoptic cable is substantially greater than a length of the fiber optic cable carrying portion of the sensor support substrate; and
the optical fiber of the at least one detection sensor extends substantially non-linearly over a length of the fiber optic cable carrying portion of the sensor support substrate.

* * * * *